June 25, 1935. A. L. PRICE ET AL 2,006,179
VOLTAGE SURGE INDICATOR
Filed May 5, 1930
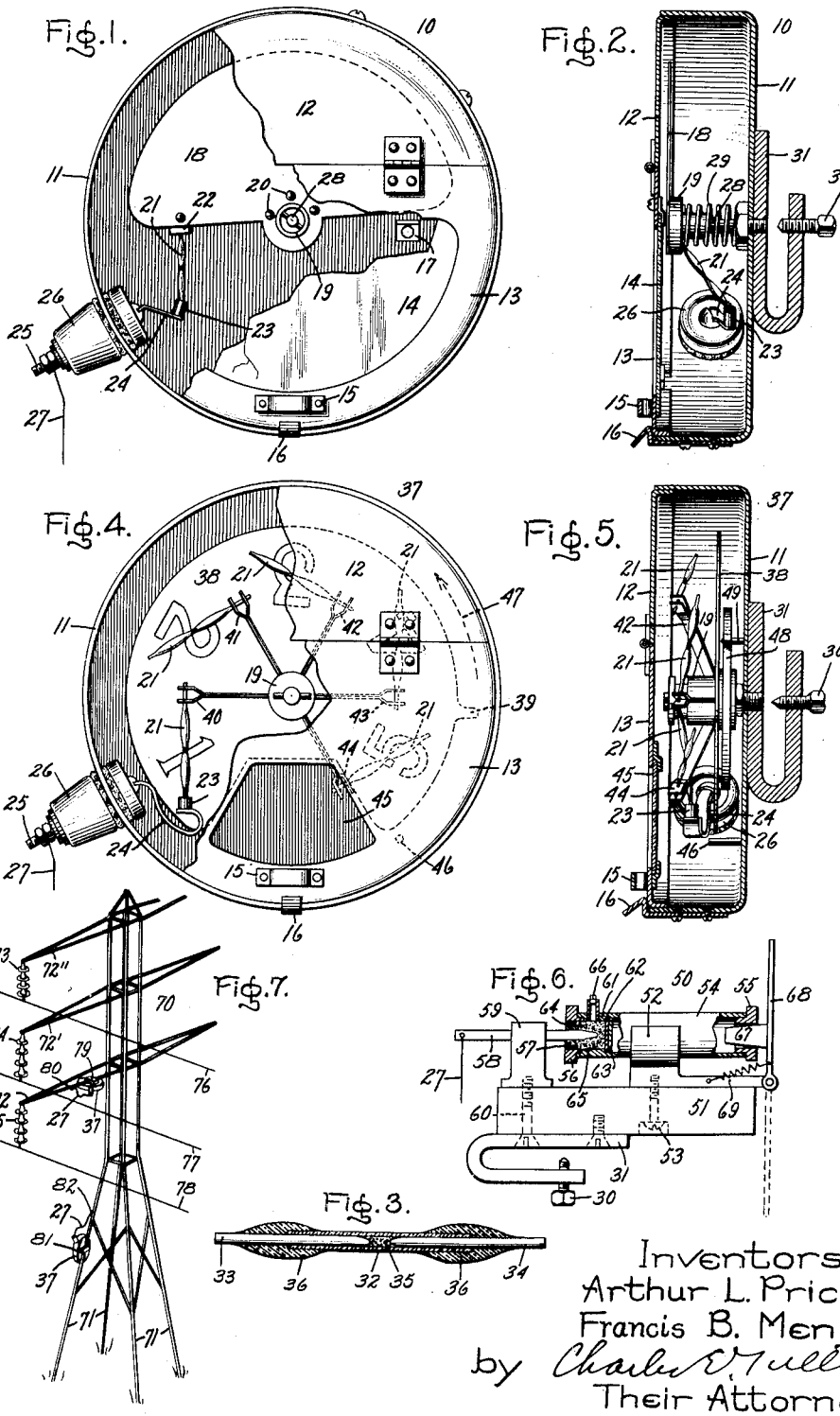
Inventors:
Arthur L. Price,
Francis B. Menger,
by Charles E. Tullar
Their Attorney.

Patented June 25, 1935

2,006,179

UNITED STATES PATENT OFFICE 2,006,179

VOLTAGE SURGE INDICATOR

Arthur L. Price and Francis B. Menger, Schenectady, N. Y., assignors to General Electric Company, a corporation of New York Application May 5, 1930, Serial No. 449,998

21 Claims. (Cl. 177—311)

Our invention consists of a device to indicate when a lightning stroke has discharged directly through a transmission tower and when for any reason a flashover has occurred from the power lines over the insulators and into the tower or vice versa. Not infrequently the power lines are struck by lightning which flashes over the insulators and travels through the tower and into the ground. Often, lightning storms near power lines induce therein high voltages which flash over the insulators and travel through the tower and into the ground. These flashovers usually interrupt the power service and sometimes damage the insulators. For periodical inspection and after a lightning storm the power company sends patrolmen to climb each tower to observe whether a flashover has occurred and whether the insulators are damaged. Even if no damage resulted the power companies are desirous of quickly determining which set or sets of insulators and towers are subjected to the most flashovers and surges so that suitable steps may be taken to prevent or reduce such flashovers and surges before serious damage occurs. The climbing of each tower involves considerable danger, time and expense, and in addition, the visual inspection of the insulators can not be depended on to determine whether they have been flashed over, especially if they are not visually damaged. We greatly reduce the time, labor, and the danger of high tension insulator and line inspection and enable weak or damaged insulators to be quickly located by means of our invention which consists of an indicator responsive to flashovers and voltage surges of the character described, which indicator gives a permanent indication of the occurrence of such flashovers and surges that is easily visible from the ground or from an automobile driven along a road paralleling the transmission line. One form of our invention consists of a disc held in an invisible position by a link which is broken when a flashover occurs, thus permitting the disc to move into a position which is visible from the ground. After a lightning storm the patrolmen can make a rapid tour over the transmission system, climbing only those towers whose device indicates a flashover has occurred and resetting the device by insertion of a new link. Two or more flashovers may occur at a single point before the device is reset and thus greater accuracy in the records of flashovers and greater economy in the maintenance of patrolmen is obtained by a modification of our invention responsive to several flashovers without resetting and indicating the number of flashovers to the capacity of the device. In another modification of our invention we use the expansive property of an explosive mixture which is ignited by a spark brought about by the flashover to move a disc from an invisible position to a position visible from the ground. Flashovers cause a voltage surge in the power lines and towers whereas a direct lightning stroke discharged through the tower causes a voltage surge in the tower and often in the power lines. Our device may be used to indicate either of the above phenomena and we therefore choose to call our device a voltage surge indicator. Our invention will however be best understood from the following description when considered in connection with the accompanying drawing while the features of our invention which are believed to be novel and patentable are pointed out in the appended claims.

Figs. 1 and 2 represent front and side views of our device constructed to be responsive to and capable of indicating only a single voltage surge before resetting. Fig. 3 represents a preferred construction of the link which is broken when a voltage surge occurs, thus permitting movement of the indicator disc. Figs. 4 and 5 represent front and side views of our device constructed to be responsive to and capable of indicating a plurality of voltage surges before resetting. Fig. 6 represents a modification of our invention making direct use of the expansive property of an ignited explosive mixture to move the indicator disc. Fig. 7 represents a transmission tower with insulators, power lines and our indicator mounted on different tower portions for reasons explained in connection with Fig. 7.

In Fig. 1 the entire indicator is represented by 10 of which 11 represents a circular casing to which is fastened a front metallic cover 12 having a hinged metallic portion 13 with a glass window 14. The portion 13 is opened by the handle 15 and held tightly closed by the spring clamp 16, and 17 represents a stop projection fastened to the casing 11. A white painted disc 18 is secured to the hub 19 by pins 20. When the disc 18 is in the position shown in Fig. 1, it is hidden from observation by the cover part 12 and the adjacent metallic strip of cover part 13. The disc 18 is held in t is position by the link 21 which is placed between the contact blocks 22 and 23, these contact blocks being secured respectively to the disc 18 and the contact strip 24 which is connected to the stud 25 passing through the insulating bushing 26 secured to the casing 11, and 27 represents a wire connected to stud 25.

In Fig. 2 it is seen that the hub 19 fits over the stationary shaft 28 fastened to the casing 11 and the hub 19 is engaged by the spring 29 which tends to rotate the disc 18 in a counter-clockwise direction (Fig. 1) but is prevented from so doing by the link 21. A bolt 30 is threaded into the clamp 31 fastened to the casing 11. The disc 18 and hence the contact block 22 is thus grounded to the casing 11 and the clamp 31.

An enlarged view of the link 21 is shown in Fig. 3 in which 32 represents a frangible glass tube about .007" thick and in which is inserted the spaced apart electrodes 33 and 34, thus forming a closed chamber in the tube between the adjacent ends of the electrodes. This chamber is filled with a small quantity of black gun powder 35, and 36 represents sealing wax to prevent absorption of moisture by powder 35.

The following description of the operation of the indicator is to be considered in connection with Figs. 1, 2 and 3. When an appreciable voltage surge discharges through a tower it is accompanied by a difference of potential between the ground and the portion of the tower where the voltage surge enters. The indicator is clamped to the tower by clamp 31 and the bolt 30, and the wire 27 is clamped to another portion of the tower at a suitable distance from the clamp 31 (see Fig. 7). The shunt circuit between the clamping points is interrupted only by the space filled with the gun powder 35 and during a voltage surge the potential difference between the two clamping points and hence between the electrodes 33 and 34 is sufficient to cause a spark to jump across the adjacent ends of electrodes 33 and 34, thus igniting the powder 35 whose generated gases expand and break the glass 32, hence permitting the spring 29 to rotate the disc 18 to a position underneath the window 14 so that the disc 13 is now visible from the ground. The disc 18 is prevented from overtraveling the visible position by coming against the projection 17. The contact blocks 22 and 23 are in different vertical planes, thereby causing the link 21 to assume an angular position which assists in expelling the broken pieces of the link 21 when a voltage surge occurs, thus insuring positive indications with voltage surges. The disc is reset for the next voltage surge by returning it to the original position and inserting a new link 21.

We have conducted extensive experiments with various sizes and types of fusible links in place of the link 21 and have found that when it is desired to indicate the occurrence of a voltage surge the fusible links did not give uniform and entirely satisfactory results because a voltage surge may last less than a micro-second and hence sufficient heat is not always generated in any portion of the fusible link to melt it even with very high currents. With our link 21 we obtained consistently uniform and entirely satisfactory results because our device does not depend on the generation of a necessary amount of heat but only needs a spark to ignite the powder and this spark is produced irrespective of how long the voltage surge lasts. If it is desired to indicate voltage surges of appreciable duration a fusible link might be used.

In Figs. 4 and 5 the parts in the indicator 37 similar to those in Figs. 1 and 2 are represented by the same numbers. The dissimilar parts in Fig. 4 are as follows: 38 represents a white painted disc divided into six equal sectors, one of these sectors being entirely removed from the disc and the other five sectors being consecutively numbered 1, 2, 3, 4 and 5 with black paint to be easily read at a distance. To the disc 38 there are secured a projection 39 and five suitable spaced apart flat spring metal contact blocks, 40, 41, 42, 43 and 44, to each of which is removably secured a link 21. The cover 13 has a glass window 45 of substantially the same size as one of the sectors of the disc 38. A stationary stop pin 46 is secured to the casing 11 in the path of movement of the projection 39. The arrow 47 represents the direction of rotation of disc 38 when it is released.

In Fig. 5, it is seen that the coiled spring 48 is secured to the casing 11 by the pin 49. The other end of the spring 48 is secured to the disc 38, thus tending to rotate 38 in the direction shown by the arrow 47 in Fig. 4. In Fig. 5 it is seen that the free ends of the contact blocks 40 to 44 inclusive are not in the same vertical plane as the stationary contact 23, thus causing the links 21 to assume an angular position which assists in expelling the broken pieces of the links 21 when they are broken by a voltage surge. The contact blocks 40 to 44 inclusive are grounded to the casing 11 and the clamp 31.

A brief description of the operation follows: Assume the disc 38 to be in the position shown. The inside of the black painted casing 11 will be visible through the glass window 45 and as the patrolman making the round of inspection does not see any white sector through 45 he proceeds to the next tower without delay. In the position shown the link 21 secured to the contact block 40 is in contact with the stationary contact block 23, thus preventing rotation of the disc 38. When a voltage surge breaks this link the spring 48 rotates the disc 38 until the link 21 secured to contact block 41 comes into contact with block 23, thus moving the sector marked 1 under the glass window 45 and indicating that one voltage surge has occurred. As each successive link 21 is broken another sector of disc 38 is moved under 45 and correctly indicates the number of voltage surges. When five voltage surges have occurred the sector marked 5 will be visible under the window 45 and the projection 39 will be against the pin 46, thus preventing overtravel of 38 which would result in erroneous indications. The patrolman noting a white sector visible through the window 45 can easily read the black painted numbers indicating the number of voltage surges which have occurred and when the indicator shows 5, the patrolman knowing the capacity of the indicator has been reached, climbs the tower, inserts five new links 21 and resets the disc 38 to the position shown. The flat spring metal contact blocks 40 to 44 inclusive provide sufficient cushioning to prevent breakage of links 21 as they are brought into contact with contact block 23.

Fig. 6 represents a modification of our invention making direct use of the expansive property of an ignited explosive mixture to move the disc from an invisible to a visible position, and in this figure similar parts to those in Fig. 1, 2 and 3 are represented by the same numbers. The entire indicator is represented by 50 and 51 represents a metallic base to which is secured a semicircular clip 52 by screw 53. The clip 52 firmly grips a brass shell 54 having removably secured flanges 55 and 56, the latter having an insulating bushing 57 through which protrudes the electrode 58 which also passes through the insulating bushing 59 secured to 51 by screw 60. Inside the shell 54 there is a shoulder 61 against which rests a brass plunger 62 behind which is a stiff wad of packing 63 to prevent moisture entering the powder 64 in the chamber 65 which has a removably secured plug 66. There is a slight gap between the end of 58 and 62. Through a hole in 55 there protrudes a cork 67 secured to disc 68 held by spring 69 in an invisible position represented by the full line position. It is seen that the brass plunger 62 acts as another electrode and the circuit between the electrode 58 and the clamp 31 is interrupted only by the space filled with the powder 64, and during a voltage surge the potential difference between the portions of the tower to which 27 and 30 are respectively secured (see Fig. 7) causes a spark to jump between 62 and the end of 58, thus igniting the powder 64 whose generated gases expand and push parts 62 and 63 against the flange 55, thus expelling the cork 67 and causing the disc 68 to fall to the dotted position where it is visible from the ground. To reset the indicator for the next voltage surge the patrolman pushes 62 and 63 back to the shoulder 61, re-inserts 67, removes 66, inserts new powder 64 and replaces 66.

The operation of our invention to indicate voltage surges due to different phenomena is best understood from the following description when considered in connection with Fig. 7 in which 70 represents a transmission tower having legs 71, arms 72, 72', 72'', and insulators 73, 74 and 75 to which are secured power lines 76, 77 and 78 respectively. If it is desired to indicate flashovers on insulators 75, one of the indicators described, as for example indicator 37, is clamped on the arm 72 at the point 79 and the lead 27 clamped at point 80. A voltage surge through the metal tower arm to which the indicator 37 is clamped will occasion a momentary current flow and hence a temporary difference of potential along said arm. Connected in shunt to this current path is the lead 27 connected to electrode 33, the spark gap and electrode 34 (see Figs. 3 and 4) which is connected through the metal casing of the indicator to the tower arm by the clamp 31 and bolt 38. While the greatest portion of the current surge goes through the tower arm a very small portion will pass through the shunt circuit and will cause a spark to jump across the narrow gap surrounded by the gun powder. By this shunting of a very small percentage of the surge current to operate the indicator the latter is relieved of the shock and necessary damage that would result if an attempt were made to utilize any considerable portion of the surge current. If lightning strikes the line 78, or if a nearby lightning storm induces a voltage in line 78, and if in either event the voltage surge is sufficient to flash over the insulators 75, thus discharging through the arm 72 and into the ground, there will be a potential difference between points 79 and 80 which if suitably spaced will cause a spark to jump between the electrodes of the indicator 37 which will then operate as described. The same is true when lightning striking the tower flashes over the insulators 75 and into the line 78. The indicator 37 will likewise be operated by an insulator flashover between the line 78 and either of the lines 77 or 76. The indicator 37 may be mounted on the leg 71 and with suitable spacing between the contact points 81 and 82 the indicator 37 on the leg 71 will operate when a flashover occurs from any of the power lines over their respective insulators to ground or when the tower 70 is struck by lightning which discharges into the ground since in the latter case a higher voltage per foot of leg 71 will exist than in the case of insulator flashovers. Obviously the spacing of points 81 and 82 on leg 71 may be chosen so that the indicator 37 will operate only on direct lightning strokes hitting the tower 70, and if desired another indicator 37 may be used for indicating flashovers on the insulators. Several indicators having different lengths of spark gaps or connected across different lengths of the tower may be used to estimate the magnitudes of the voltage surges in the tower.

We have described our invention in connection with black gun powder, but any explosive material or gas may be used and we have made successful experiments with explosive gases. We have described the link with a glass tube but any frangible insulating material may be used instead. It is evident that many variations in the construction of our device may be made without departing from the underlying principles of our invention and we therefore wish it understood that we intend to include in the appended claims all modifications which are within the true spirit and scope of our invention.

What we claim as new and desire to secure by Letters Patent of the United States, is,—

1. A voltage surge indicator comprising a movable arm having a contact, a stationary contact positioned in a plane which is displaced from the plane in which said arm moves, a link consisting of two spaced apart electrodes, a frangible tube surrounding said electrodes and forming a closed chamber in said tube between the adjacent ends of said electrodes and an explosive mixture in said chamber, the said link being positioned between said contacts so as to cause said arm to assume a given stationary position with the plane of the link being at an angle to the plane in which said arm moves, and means for moving said arm to a different stationary position in response to the breaking of said link.

2. A voltage surge indicator comprising a rotatable member movable in a given plane, a plurality of contacts movable with said member, a stationary contact positioned in a plane which is displaced from the plane in which said member rotates, a separate link secured at one end thereof to each of said movable contacts, each link being adapted to break when a voltage in excess of a predetermined value is impressed across its ends for a few micro-seconds, the free end of one link normally making contact with said stationary contact so as to cause said member to assume a given stationary position while the free ends of the remaining links are positioned so as to come consecutively into contact with said stationary contact as the member is rotated in a given direction so as to cause the member to assume correspondingly different stationary positions, each link making contact with said stationary contact being in a plane which is at an angle to the plane in which said member rotates, and means responsive to the breaking of the link whose free end is in contact with said stationary contact for effecting rotation of said member in said given direction.

3. A voltage surge indicator comprising a rotatable disc, a plurality of contacts movable with said disc, a stationary contact positioned in a plane which is displaced from the plane in which said disc rotates, a separate link secured at one end thereof to each of said movable contacts, each link consisting of two spaced apart electrodes, a frangible tube surrounding said electrodes and forming a closed chamber in the tube between the adjacent ends of the electrodes and an explosive mixture in said chamber, the free end of one link normally making contact with said stationary contact so as to cause said disc to assume a given stationary position while the free ends of the remaining links are positioned so as to consecutively come into contact with said stationary contact as the disc is rotated in a given direction so as to cause said disc to assume correspondingly different stationary positions, each link making contact with said stationary contact member being in a plane which is at an angle to the plane in which said disc rotates, and means responsive to the breaking of the link whose free end is in contact with said stationary contact member for effecting rotation of said disc in said given direction.

4. A voltage surge indicator comprising a casing, a rotatable indicating arm within said casing, a contact secured to said arm, a stationary contact, means tending to rotate said arm in a given direction, a link between said contacts for normally maintaining said arm in a given stationary position, said link comprising two spaced apart electrodes having their adjacent ends surrounded by a frangible tube adapted to form a closed chamber between said adjacent ends and an explosive mixture in said chamber, means for limiting the rotation of said arm to a second stationary position following the breaking of said link, and a cover for said casing adapted to render said arm invisible when the latter is in its first mentioned stationary position and visible when the latter is in its second mentioned stationary position.

5. A voltage surge recorder comprising a casing, a rotatable disc within said casing, said disc having conspicuously marked thereon a predetermined number of consecutively arranged figures, a cover for said casing having a transparent section for permitting only a portion of said disc to be visible, a plurality of contacts movable with said disc, there being a movable contact for each of said figures, a stationary member in electrical contact with said movable contacts, a stationary contact, a separate link having one end thereof removably secured to each of said movable contacts, each link consisting of two spaced apart electrodes having their adjacent ends surrounded by a frangible tube adapted to form a closed chamber between said adjacent ends and an explosive mixture in said chamber, said contacts and said figures on said disc being so arranged that with the free end of one of said links in contact with said stationary contact none of said figures on said disc is visible through the transparent section of said cover, and with rotation of said disc in a given direction the free ends of the remaining links consecutively come into contact with said stationary contact and the figures on said disc consecutively become visible through the transparent section of said cover, means for rotating said disc in said given direction in response to the breaking of a link whose free end is in contact with said stationary contact, and means for limiting the rotation of said disc in said given direction to the position corresponding to the highest figure on said disc being visible through the transparent section of said cover.

6. In combination, a grounded electrically conducting member having a low resistance per linear foot, a voltage responsive element electrically connected across a portion of said conducting member, said voltage responsive element being adapted to permit a current flow therethrough only when the voltage impressed on it exceeds a predetermined value, a movable member normally maintained in a given stationary position by said voltage responsive element, said movable member being biased to move into another stationary position in response to a flow of current through said voltage responsive element, and means associated with said movable member for making it invisible when it is in one of its stationary positions and visible when it is in its other stationary position.

7. In combination, a grounded metallic tower having a low resistance per linear foot and an indicator secured to said tower, said indicator comprising a voltage responsive element electrically connected across a portion of said tower, said voltage responsive element permitting a current to flow through it only when the voltage impressed on it exceeds a predetermined value, a casing having a transparent section and a non-transparent section, a movable element within said casing normally maintained by said voltage responsive element in a position under the non-transparent section of said casing so as to be invisible from the base of said tower, and means responsive to a flow of current through said voltage responsive element for actuating said movable element to a position under the transparent section of said casing so as to be visible from the base of said tower.

8. A voltage surge indicator comprising a casing having a transparent section and a non-transparent section, a rotatable arm within said casing having a contact, a stationary contact positioned in a plane which is displaced to one side of the plane in which said arm rotates, an explosive link between said contacts for normally maintaining said arm in an invisible position under the non-transparent section of said casing with the plane of the link at an angle to the plane in which said arm rotates, said link comprising two spaced apart electrodes having their adjacent ends surrounded by a frangible tube adapted to form a closed chamber and an explosive mixture in said closed chamber, and means responsive to the breaking of said link for rotating said arm to a visible stationary position under the transparent section of said casing.

9. A voltage surge indicator comprising a casing having a transparent section and a non-transparent section, a movable member within said casing, said member having a predetermined number of consecutively arranged conspicuous figures, a plurality of voltage responsive elements each having one end thereof secured to said movable member, each voltage responsive element being adapted to permit a current flow therethrough only when the voltage impressed on it exceeds a predetermined value, a stationary contact electrically connected to that end of each of said voltage responsive elements which is secured to said movable member, another stationary contact, the figures on said movable member and said voltage responsive elements being so arranged that with movement of said member in a given direction the free ends of said voltage responsive elements consecutively come into contact with the second mentioned stationary contact and the figures on said member consecutively become visible through the transparent section of said casing, said movable member being biased to move in said given direction in response to a flow of current through the voltage responsive element whose free end is in contact with the second mentioned stationary contact, and means for limiting the movement of said movable member in said given direction to the position corresponding to the highest figure on said member being visible through the transparent section of said casing.

10. A voltage surge indicator comprising a casing having a transparent section and a non-transparent section, a rotatable disc within said casing, said disc having a predetermined number of consecutively arranged conspicuous figures, a plurality of links each having one end thereof secured to said disc, each link being adapted to break when a voltage in excess of a predetermined value is impressed on its ends for a few micro-seconds, a stationary contact electrically connected to that end of each of said links which is secured to said disc, another stationary contact, the figures on said disc and said links being so arranged that with rotation of said disc in a given direction the free ends of said links consecutively come into contact with the second mentioned stationary contact and the figures on said disc consecutively become visible through the transparent section of said casing, means for rotating said disc in said given direction in response to the breaking of the link whose free end is in contact with the second mentioned stationary contact, and means for limiting the rotation of said disc in said given direction to the position corresponding to the highest figure on said disc being visible through the transparent section of said casing.

11. In combination, a grounded metallic tower having a low resistance per linear foot and a voltage surge indicator asociated with said tower, said indicator comprising a casing having a transparent section and a non-transparent section, a rotatable arm within said casing having a contact, a stationary contact, an explosive link between said contacts for normally maintaining said arm in a stationary position under the non-transparent section of said casing so as to be invisible from the ground, said link consisting of two spaced apart electrodes having their adjacent ends surrounded by a frangible tube adapted to form a closed chamber and an explosive mixture in said closed chamber, means for electrically connecting said link across a portion of said tower, and means responsive to the breaking of said link for rotating said arm to a position under the transparent section of said casing so as to be visible from the ground.

12. In combination, a grounded electrically conducting member having a low resistance per linear foot and a voltage surge indicator associated with said conducting member, said indicator comprising a link electrically connected across a portion of said conducting member, said link being adapted to break when a voltage in excess of a predetermined value is impressed across its ends for a few micro-seconds, a movable arm normally maintained by said link in a stationary position, said movable arm being biased to move into another stationary position in response to the breaking of said link, and means associated with said movable arm for making it invisible when it is in one of its stationary positions and visible when it is in its other stationary position.

13. In combination, a grounded electrically conducting member having a low resistance per linear foot and a voltage surge indicator associated with said conducting member, said indicator comprising a casing having a transparent section and a non-transparent section, a movable arm within said casing, an explosive link for normally maintaining said arm in a stationary position under the non-transparent section of said casing so as to be invisible from the ground, said link consisting of two spaced apart electrodes having their adjacent ends surrounded by a frangible tube adapted to form a closed chamber and an explosive mixture in said chamber, and means for electrically connecting said link across a portion of said conducting member, said movable arm being biased to move into a stationary position under the transparent section of said casing in response to the breaking of said link so as to be visible from the ground.

14. In combination, a grounded electrically conducting member having a low resistance per linear foot and a voltage surge indicator associated with said conducting member, said indicator comprising a casing having a transparent section and a non-transparent section, a rotatable disc within said casing, said disc having a predetermined number of consecutively arranged conspicuous figures, a plurality of voltage responsive elements rotatable with said disc, each voltage responsive element being adapted to permit a current flow therethrough only when the voltage impressed on it exceeds a predetermined value, a stationary contact electrically connected to one end of each of said voltage responsive elements, another stationary contact, the figures on said disc and said voltage responsive elements being so arranged that with rotation of said disc in a given direction the free ends of said voltage responsive elements consecutively come into contact with the second mentioned secondary contact and the figures on said disc consecutively become visible through the transparent section of said casing, means for electrically connecting said stationary contacts across a portion of said conducting member, means for rotating said disc in said given direction in response to a flow of current through the voltage responsive element whose free end is in contact with the second mentioned stationary contact, and means for limiting the rotation of said disc in said given direction to the position corresponding to the highest figure on said disc being visible through the transparent section of said casing.

15. In combination, a grounded electrically conducting member having a low resistance per linear foot and a voltage surge indicator associated with said conducting member, said indicator comprising a rotatable disc, a plurality of links rotatable with said disc, each link being adapted to break when a voltage in excess of a predetermined value is impressed across its ends for a few micro-seconds, a stationary contact electrically connected to one end of each of said links, another stationary contact, the links being so arranged that with rotation of said disc in a given direction the free ends of the links consecutively come into contact with the second mentioned contact, means for electrically connecting said stationary contacts across a portion of said conducting member, means for rotating said disc in said given direction in response to the breaking of the link whose free end is in contact with the second mentioned stationary contact, and means associated with said disc and said casing for visually indicating how many of said links are broken.

16. In combination, a grounded metallic tower having a low resistance per linear foot and a voltage surge indicator associated with said tower, said indicator comprising a casing having a transparent section and a non-transparent section, a rotatable disc within said casing, said disc having a predetermined number of consecutively arranged conspicuous figures, a plurality of explosive links rotatable with said disc, each link consisting of two spaced apart electrodes having their adjacent ends surrounded by a frangible tube adapted to form a closed chamber between said adjacent ends and an explosive mixture in said chamber, a stationary contact electrically connected to one end of each of said links, another stationary contact, the figures on said disc and said links being so arranged that with rotation of said disc in a given direction the free ends of the links consecutively come into contact with the second mentioned stationary contact and the figures on said disc consecutively become visible through the transparent section of said casing, means for electrically connecting said stationary contacts across a portion of said tower, means for rotating said disc in said given direction in response to the breaking of a link whose free end is in contact with the second mentioned stationary contact, and means for limiting the rotation of said disc in said given direction to the position corresponding to the highest figure on said disc being visible through the transparent section of said casing.

17. A voltage surge indicator comprising a movable member, an explosive link for normally maintaining said member in a given stationary position, said link consisting of two spaced apart electrodes having their adjacent ends surrounded by a frangible tube adapted to form a closed chamber and an explosive mixture in this chamber subjecting the chamber to transverse disruption upon ignition of said mixture by a voltage surge between said electrodes, said movable member being biased to move into another stationary position in response to the breaking of said link, and means associated with said movable member for making it invisible when it is in one of its stationary positions and visible when it is in its other stationary position.

18. A voltage surge indicator comprising a casing having a transparent section and a non-transparent section, a movable member within said casing, an explosive link within said casing for normally maintaining said movable member in a stationary position under the non-transparent section of said casing so as to be invisible, said link consisting of two spaced apart electrodes having their adjacent ends surrounded by a frangible tube adapted to form a closed chamber and an explosive mixture in this chamber subjecting the chamber to transverse disruption upon ignition of said mixture by a voltage surge between said electrodes, and said movable member being biased to move into another stationary position under the transparent section of said casing in response to the breaking of said link so as to be visible.

19. A voltage surge indicator comprising a casing having a transparent section and a non-transparent section, a stationary contact within said casing, a movable member within said casing, said member having thereon a predetermined number of consecutively arranged conspicuous figures, a plurality of explosive links each having one end thereof secured to said movable member, each link consisting of two spaced apart electrodes having their adjacent ends surrounded by a frangible tube adapted to form a closed chamber and an explosive mixture in this chamber, the figures on said movable member and said links being so arranged that with movement of said member in a given direction the free ends of said links consecutively come into contact with said stationary contact and the figures on said member become consecutively visible through the transparent section of said casing, said movable member being biased to move in said given direction in response to the breaking of a link whose free end is in contact with said stationary contact, and means for limiting the movement of said movable member in said given direction to the position corresponding to the highest figure on the member being visible through the transparent section of said casing.

20. In combination, a grounded electrically conducting member having a low resistance per linear foot and a voltage surge indicator associated with said conducting member, said indicator comprising an explosive link electrically connected across a portion of said conducting member, said link consisting of two spaced apart electrodes having their adjacent ends surrounded by a frangible tube adapted to form a closed chamber and an explosive mixture in this chamber, a movable member normally maintained by said link in a given stationary position, said movable member being biased to move into another stationary position in response to the breaking of said link, and means associated with said movable member for making it invisible when it is in one of its stationary positions and visible when it is in its other stationary position.

21. In combination, a grounded electrically conducting member having a low resistance per linear foot and a voltage surge indicator associated with said conducting member, said indicator comprising a casing having a transparent section and a non-transparent section, a movable member within said casing, said movable member having thereon a predetermined number of consecutively arranged conspicuous figures, a plurality of explosive links each having one end thereof secured to said movable member, each link consisting of two spaced apart electrodes having their adjacent ends surrounded by a frangible tube adapted to form a closed chamber and an explosive mixture in this chamber, a stationary contact, the figures on said movable member and said links being so arranged that with movement of said member in a given direction the free ends of said links consecutively come into contact with said stationary contact and the figures on said member become consecutively visible through the transparent section of said casing, means for electrically connecting that end of each link which is secured to said movable member to one point on said conducting member, means for electrically connecting said stationary contact to another point on said conducting member, said movable member being biased to move in said given direction in response to the breaking of a link whose free end is in contact with said stationary contact, and means for limiting the movement of said movable member in said given direction to the position corresponding to the highest figure on the member being visible through the transparent section of said casing.

ARTHUR L. PRICE.
FRANCIS B. MENGER.